US008795824B2

(12) United States Patent
Ishikawa et al.

(10) Patent No.: US 8,795,824 B2
(45) Date of Patent: Aug. 5, 2014

(54) LIGHT DIFFUSING RESIN COMPOSITION AND LIGHT DIFFUSING PLATE USING THE SAME

(75) Inventors: Yasuhiro Ishikawa, Ichihara (JP); Masami Kogure, Ichihara (JP); Hiroshi Kawato, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 836 days.

(21) Appl. No.: 12/299,216

(22) PCT Filed: Apr. 9, 2007

(86) PCT No.: PCT/JP2007/057838
§ 371 (c)(1),
(2), (4) Date: Oct. 31, 2008

(87) PCT Pub. No.: WO2007/132604
PCT Pub. Date: Nov. 22, 2007

(65) Prior Publication Data
US 2009/0186208 A1    Jul. 23, 2009

(30) Foreign Application Priority Data
May 11, 2006   (JP) ................................. 2006-132970

(51) Int. Cl.
*B32B 27/28*   (2006.01)
*C08L 67/00*   (2006.01)
*C08K 3/32*   (2006.01)
*C08K 5/54*   (2006.01)
*C08K 5/1515*   (2006.01)
*C08K 5/49*   (2006.01)
*C08G 64/04*   (2006.01)
*G02B 1/04*   (2006.01)
*G02B 5/02*   (2006.01)
*C08L 69/00*   (2006.01)
*C08L 83/04*   (2006.01)
*G02F 1/1335*   (2006.01)
*C08K 3/36*   (2006.01)
*C08K 7/14*   (2006.01)
*C08K 7/10*   (2006.01)
*C08L 33/06*   (2006.01)

(52) U.S. Cl.
CPC .............. *G02B 5/0242* (2013.01); *C08L 83/04* (2013.01); *G02F 1/133504* (2013.01); *C08K 3/36* (2013.01); *C08K 7/14* (2013.01); *C08K 7/10* (2013.01); *C08G 64/04* (2013.01); *G02B 1/04* (2013.01); *C08L 33/06* (2013.01); *C08L 69/00* (2013.01)

USPC ........... 428/220; 524/601; 524/539; 524/414; 524/267; 524/114; 525/190; 525/464

(58) Field of Classification Search
USPC .......... 428/220; 524/414, 601, 539, 267, 114, 524/417, 115; 525/190, 464
See application file for complete search history.

(56) References Cited

U.S. PATENT DOCUMENTS

| | | | | |
|---|---|---|---|---|
| 6,482,916 B1 * | 11/2002 | Takuma et al. | ............... | 528/196 |
| 2007/0213452 A1 * | 9/2007 | Kawato et al. | ............... | 524/502 |
| 2009/0080079 A1 * | 3/2009 | Kogure et al. | ............... | 359/599 |

FOREIGN PATENT DOCUMENTS

| | | |
|---|---|---|
| JP | 63 89539 | 4/1988 |
| JP | 2002 338798 | 11/2002 |
| JP | 2002 348367 | 12/2002 |
| JP | 2003 96179 | 4/2003 |
| JP | 2003 192780 | 7/2003 |
| JP | 2003 261670 | 9/2003 |
| JP | 2003261670 A * | 9/2003 |
| JP | 2004 149745 | 5/2004 |
| JP | 2005 018993 | 1/2005 |
| JP | 2005 298710 | 10/2005 |
| WO | WO 2005100476 A1 * | 10/2005 |
| WO | WO 2006132092 A1 * | 12/2006 |

OTHER PUBLICATIONS

Machine_English_Translation_JP_2003_261670_A, Yasuda, Production Method of Aromatic Polycarbonate, Sep. 9, 2003, JPO, pp. 1-12.*
U.S. Appl. No. 12/299,121, filed Oct. 31, 2008, Ishikawa.
U.S. Appl. No. 12/297,786, filed Oct. 20, 2008, Ishikawa.
U.S. Appl. No. 11/994,031, filed Dec. 27, 2007, Kawato, et al.

* cited by examiner

*Primary Examiner* — Aaron Austin
*Assistant Examiner* — Tahseen N Khan
(74) *Attorney, Agent, or Firm* — Oblon, Spivak, McClelland, Maier & Neustadt, L.L.P.

(57) ABSTRACT

Provided is a light diffusing resin composition, which, when molded into a large-plane light diffusing plate, is free of yellowing due to thermal deterioration, and can exhibit good light diffusing property, and a light diffusing plate using the resin composition. The light diffusing resin composition includes 100 parts by mass of a polycarbonate resin containing a polycarbonate copolymer (A) having repeating structural units represented by formulae (I) and (II) and 0.01 to 10 parts by mass of a light diffusing agent (B).

18 Claims, No Drawings

LIGHT DIFFUSING RESIN COMPOSITION AND LIGHT DIFFUSING PLATE USING THE SAME

TECHNICAL FIELD

The present invention relates to a light diffusing resin composition to be used in, for example, an optical device in a liquid crystal display field such as a light diffusing plate, or a glass alternative application such as a street light cover or a laminated glass for vehicles and building materials, and a light diffusing plate using the composition, and more specifically, to a light diffusing resin composition obtained by blending a polycarbonate copolymer having a specific repeating structural unit with, preferably, a polycarbonate resin except the polycarbonate copolymer and/or an acrylic resin, and a light diffusing agent, and a light diffusing plate using the composition.

BACKGROUND ART

A liquid crystal display (LCD) has been finding use in an expanded variety of applications covering not only a notebook personal computer and a monitor but also a television set (TV) in recent years. In most cases, a light diffusing plate made of an acrylic resin has been used as a light diffusing plate for a direct type backlight which is to be mounted on a TV and which is requested to have particularly high brightness. Recently, however, a polycarbonate resin that is superior to an acrylic resin in thermal resistance and hygroscopicity has been used as a matrix resin for a light diffusing plate, and there has been a growing demand for the polycarbonate resin.

A sheet obtained by an extrusion molding method has been conventionally the mainstream of a light diffusing plate made of a polycarbonate resin. The reason for the foregoing is as follows: the polycarbonate resin has low melt flowability, so, when one tries to produce a large-area display more than 50 cm (20 inches) on a side by an injection molding method, a molded body to be obtained has problems such as a color tone failure due to the thermal deterioration of the polycarbonate resin and insufficient thickness accuracy.

However, a light diffusing plate obtained by the injection molding method can be expected to provide the following merit: a cost for processing the outside shape of the light diffusing plate obtained by the injection molding method can be reduced as compared to that in the case of a light diffusing plate obtained by the extrusion molding method.

By the way, a copolymer composed of α,α'-bis(4-hydroxyphenyl)-m-diisopropylbenzene (hereinafter, may be referred to as bisphenol M) and 2,2-bis(4-hydroxyphenyl)propane (hereinafter, may be referred to as bisphenol A) has been known (see, for example, Patent Document 1). Known applications of the copolymer are an optical lens (see, for example, Patent Documents 2 and 3) and an optical disk substrate (see, for example, Patent Document 4) because the copolymer has low water absorption property and low birefringence. At present, however, no resin material showing excellent light diffusing performance and excellent moldability has been technically established yet.

In addition, a light diffusing resin composition obtained by blending 100 parts by weight of an aromatic polycarbonate resin produced from bisphenol A with specific amounts of an acrylic resin and a light diffusing agent has been known (see, for example, Patent Document 5).

However, when such aromatic polycarbonate resin is molded into a light diffusing plate, the temperature at which the resin is molded must be increased in order that melt flowability sufficient for an increase in size of the plate may be obtained. However, the color tone of a light diffusing plate to be obtained becomes yellowish owing to the thermal deterioration of the polycarbonate resin to be used, so it is hard to obtain a light diffusing plate having satisfactory performance. In view of the foregoing, a resin material a light diffusing plate molded out of which can be additionally increased in size and has excellent light diffusing performance has been requested.

Patent Document 1: JP 63-89539 A
Patent Document 2: JP 2003-192780 A
Patent Document 3: JP 2003-96179 A
Patent Document 4: JP 2002-348367 A
Patent Document 5: JP 2005-298710 A

DISCLOSURE OF THE INVENTION

Problems to be Solved by the Invention

The present invention has been made with a view to solving the above-mentioned problems, and an object of the present invention is to provide a light diffusing resin composition using a polycarbonate resin and having the following characteristics, and a light diffusing plate using the resin composition: even when the composition is molded into a large-sized light diffusing plate, a molded article which is free of yellowing due to the thermal deterioration of the resin and which has good light diffusing properties can be obtained.

Means for Solving the Problems

The inventors of the present invention have made extensive studies with a view to solving the above-mentioned problems. As a result, the inventors have found that the above-mentioned problems can be solved with: a resin composition obtained by blending a polycarbonate resin containing a polycarbonate copolymer having a specific repeating structural unit with a light diffusing agent; or a light diffusing resin composition obtained by blending the polycarbonate resin with a polycarbonate resin except the polycarbonate copolymer and/or an acrylic resin, and a light diffusing agent. Thus, the inventors have completed the present invention.

That is, the present invention provides:

(1) a light diffusing resin composition including: a polycarbonate resin containing a polycarbonate copolymer (A) having repeating structural units represented by the following formulae (I) and (II) and a light diffusing agent (B), the light diffusing agent (B) being blended in an amount of 0.01 to 10 parts by mass into 100 parts by mass of the polycarbonate resin.

[Chem 1]

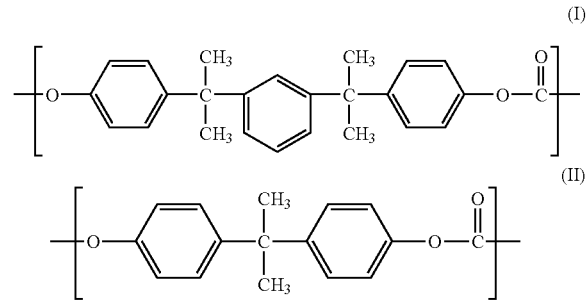

(2) the light diffusing resin composition according to the item (1), in which the polycarbonate copolymer (A) has a viscosity number of 30 to 70;

(3) the light diffusing resin composition according to the item (1) or (2), in which the polycarbonate copolymer (A) to be used contains the repeating structural units each represented by the formula (I) and the repeating structural units each represented by the formula (II) at a molar ratio of 1:99 to 99:1;

(4) the light diffusing resin composition according to any one of the items (1) to (3), further including an acrylic resin (C) blended in an amount of 0.01 to 1 part by mass into 100 parts by mass of the polycarbonate resin;

(5) the light diffusing resin composition according to any one of the items (1) to (4), further including a phosphorous stabilizer (D) blended in an amount of 0.001 to 0.5 part by mass into 100 parts by mass of the polycarbonate resin;

(6) the light diffusing resin composition according to any one of the items (1) to (5), further including an organopolysiloxane (E) blended in an amount of 0.01 to 1 part by mass into 100 parts by mass of the polycarbonate resin;

(7) the light diffusing resin composition according to any one of the items (1) to (6), further including an alicyclic epoxy compound (F) blended in an amount of 0.001 to 1 part by mass into 100 parts by mass of the polycarbonate resin;

(8) the light diffusing resin composition according to any one of the items (1) to (7), in which the acrylic resin (C) has a viscosity average molecular weight of 1,000 to 200,000;

(9) the light diffusing resin composition according to any one of the items (1) to (8), in which the light diffusing agent (B) includes one kind or a combination of two or more kinds selected from a crosslinked polymethyl methacrylate resin particle, a silicone resin particle, a polyorganosilsesquioxane particle, a silica particle, a quartz particle, a silica fiber, a quartz fiber, and a glass fiber;

(10) the light diffusing resin composition according to any one of the items (1) to (9), in which the light diffusing agent (B) has an average particle diameter of 1 to 200 μm;

(11) the light diffusing resin composition according to any one of the items (5) to (10), in which the phosphorus stabilizer (D) includes a phosphoric acid compound and/or an aromatic phosphine compound;

(12) the light diffusing resin composition according to any one of the items (1) to (11), further including an aromatic polycarbonate resin except the polycarbonate copolymer (A);

(13) the light diffusing resin composition according to any one of the items (1) to (12), in which the light diffusing resin composition has a viscosity number of 30 to 70; and

(14) a light diffusing plate, which is obtained by molding the light diffusing resin composition according to any one of the items (1) to (13) and has a thickness of 0.5 to 3 mm.

Effects of the Invention

According to the present invention, there can be provided the light diffusing resin composition using a polycarbonate resin and having the following characteristics, and a light diffusing plate using the resin compositions: even when the composition is molded into an optical molded body such as a large-sized light diffusing plate, a molded body which is free of yellowing due to the thermal deterioration of the resin and which has good light diffusing properties can be obtained.

BEST MODE FOR CARRYING OUT THE INVENTION

Hereinafter, a light diffusing resin composition and the like of the present invention will be described in detail.

Polycarbonate Copolymer (A)

A polycarbonate copolymer (A) of which the light diffusing resin composition of the present invention is formed has repeating units represented by the following formulae (I) and (II).

[Chem 2]

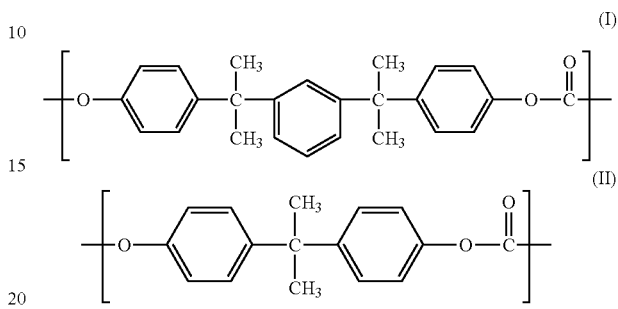

The copolymer can be produced by a conventional production method, that is, a production method referred to as an interfacial polymerization method or an ester exchange method.

To be specific, the copolymer can be produced by, for example, an interfacial polymerization method involving causing, in a solvent such as methylene chloride in the presence of a known acid acceptor such as sodium hydroxide or potassium hydroxide, or a known terminal terminator, and, furthermore, a branching agent added as required, a polycarbonate oligomer obtained by a reaction between 2,2-bis(4-hydroxyphenyl)propane represented by the following formula (III) (hereinafter, may be referred to as "bisphenol A") and a carbonate precursor such as phosgene and α,α'-bis(4-hydroxyphenyl)-m-diisopropylbenzene represented by the following formula (IV) (hereinafter, may be referred to as "bisphenol M") to react with each other.

[Chem 3]

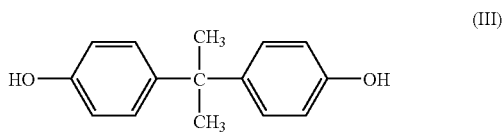

[Chem 4]

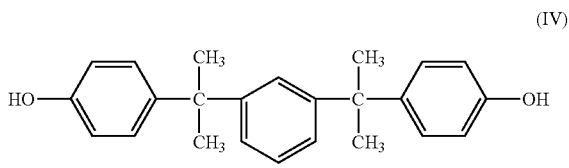

Alternatively, the copolymer can be produced by a polymerization method based on an ester exchange reaction between a carbonate precursor such as diphenyl carbonate and each of bisphenol A and bisphenol M.

In the polycarbonate copolymer (A) of the present invention, a molar ratio between the repeating structural units each represented by the above formula (I) and the repeating structural units each represented by the above formula (II) is preferably 1:99 to 99:1, or particularly preferably 1:99 to 30:70.

As long as the molar ratio between the repeating structural units each represented by the formula (I) and the repeating structural units each represented by the formula (II) in the polycarbonate copolymer (A) falls within the range, the composition can satisfy mechanical physical properties and such melt flowability that the composition can be reduced in thickness, so the composition can be favorably molded into a thin or large-sized light diffusing plate.

The polycarbonate resin described below preferably has the similar mol ratio as that of the polycarbonate copolymer (A).

Phosgene used in a general interfacial polycondensation for polycarbonate, triphosgene, bromophosgene, or the like can be used as a carbonyl source to be used in the production of the polycarbonate copolymer (A) to be used in the present invention. It should be noted that diallyl carbonate or the like can be used in the case of an ester exchange method while carbon monoxide or the like can be used in the case of an oxidative carbonylation method.

Any one of various terminal terminators can be used in the production of the polycarbonate copolymer (A) to be used in the present invention as long as the terminal terminator is typically used in the polymerization of polycarbonate. In general, any one of the monohydric phenols can be used. Examples of the monohydric phenols to be used include phenol and phenols each having a linear or branched (long-chain) alkyl group, an aliphatic polyester group, or an aromatic compound as a substituent. Specifically, phenol, o-, m-, p-cresol, p-tert-butylphenol, p-tert-amylphenol, p-tert-octylphenol, p-cumylphenol, p-methoxyphenol, p-phenylphenol, isooctylphenol, and monoalkyl phenols having a linear or branched alkyl group with an average carbon atom number of 12 to 35 at ortho-, meta-, or para-position, 9-(4-hydroxyphenyl)-9-(4-methoxyphenyl)fluorene, 9-(4-hydroxy-3-methylphenyl)-9-(4-methoxy-3-methylphenyl)-9-(4-methoxy-3-methylphenyl)fluorene, 4-(1-adamantyl)phenol, and the like are exemplified. Of those, p-tert-butylphenol, p-cumylphenol, p-tert-octylphenylphenol, and phenol are preferable.

Examples of the branching agent used in the production of the polycarbonated copolymer (A) include compounds having 3 or more functional groups: such as 1,1,1-tris(4-hydroxyphenyl)ethane; 4,4'-[1-[4-[1-(4-hydroxyphenyl)-1-methylethyl]phenyl]ethylidene]bisphenol; α,α', α''-tris(4-hydroxyphenyl)-1,3,5-triisopropylbenzene; 1-[α-methyl-α-(4'-hydroxyphenyl)ethyl]-4-[α',α'-bis(4''-hydroxyphenyl)ethyl]benzen e; phloroglycine, trimellitic acid; and isatinbis (o-cresol).

The polycarbonate copolymer (A) to be used in the present invention has a viscosity number of preferably 30 to 70, that is, 10,000 to 28,000 in terms of a viscosity average molecular weight (Mv), or more preferably 34 to 62, that is, 12,000 to 24,000 in terms of Mv. The composition can be molded into, for example, a large-sized light diffusing plate well as long as the copolymer has a viscosity number of 30 to 70.

In addition, the light diffusing resin composition to be obtained in the present invention also desirably has a viscosity number similar to that described above, that is, 30 to 70, or preferably 34 to 62.

It should be noted that such viscosity number is a value measured in conformance with ISO 1628-4 (1999).

The above-mentioned polycarbonate copolymer (A) can be blended with an aromatic polycarbonate resin except the polycarbonate copolymer (A) depending on applications where the polycarbonate resin of the present invention is used and the shape of an article molded out of the composition from the viewpoint of a balance between the physical properties of the composition.

Examples of the aromatic polycarbonate resin include resins each produced by a conventional production method, that is, typically, a reaction between a dihydric phenol and a polycarbonate precursor such as phosgene or a carbonate compound. To be specific, for example, a resin produced by a reaction between a dihydric phenol and a carbonate precursor such as phosgene in a solvent such as methylene chloride in the presence of a known acid acceptor or terminal terminator, and, furthermore, a branching agent added as required, or by an ester exchange reaction between a dihydric phenol and a carbonate precursor such as diphenyl carbonate can be used.

As the dihydric phenol to be used, various kinds of phenols are cited, in particular, 2,2-bis(4-hydroxyphenyl)propane (commonly called bisphenol A) is preferable. Examples of bisphenol other than bisphenol A include bis(hydroxyaryl)alkanes such as: bis(4-hydroxyphenyl)methane; 1,1-bis(4-hydroxyphenyl)ethane; 2,2-bis(4-hydroxyphenyl)butane; 2,2-bis(4-hydroxyphenyl)octane; 2,2-bis(hydroxyphenyl)phenylmethane; 2,2-bis(4-hydroxy-1-methylphenyl)propane; bis(4-hydroxyphenyl)naphthylmethane; 1,1-bis(4-hydroxy-t-butylphenyl)propane; 2,2-bis(4-hydroxy-3-bromophenyl)propane; 2,2-bis(4-hydroxy-3,5-tetramethylphenyl)propane; 2,2-bis(4-hydroxy-3-chlorophenyl)propane; 2,2-bis(4-hydroxy-3,5-tetrachlorophenyl)propane; and 2,2-bis(4-hydroxy-3,5-tetrabromophenyl)propane, bis(hydroxyaryl)cycloalkanes such as: 1,1-bis(4-hydroxyphenyl)cyclopentane; 1,1-bis(4-hydroxyphenyl)cyclohexane; 1,1-bis(4-hydroxyphenyl)-3,5,5-trimethylcyclohexane; and 2,2-bis(4-hydroxyphenyl)norbornene, dihydroxyarylethers such as: 4,4'-dihydroxyphenylether; and 4,4'-dihydroxy-3,3'-dimethylphenylether, dihydroxydiarylsulfides such as: 4,4'-dihydroxydiphenylsulfide; and 4,4'-dihydroxy-3,3'-dimethyldiphenylsulfide, dihydroxydiarylsulfoxides such as: 4,4'-dihydroxydiphenylsulfoxide; and 4,4'-dihydroxy-3,3'-dimethyldiphenylsulfoxide, dihydroxydiarylsulfones such as: 4,4'-dihydroxydiphenylsulfone; and 4,4'-dihydroxy-3,3'-dimethyldiphenylsulfone, dihydroxydiphenyls such as: 4,4'-dihydroxydiphenyl, dihydroxydiarylfluorenes such as: 9,9-bis(4-hydroxyphenyl)fluorene; and 9,9-bis(4-hydroxy-3-methylphenyl)fluorene, bis(4-hydroxyphenyl)diphenylmethane, dihydroxydiaryladamantanes such as: 1,3-bis(4-hydroxyphenyl)adamantane; 2,2-bis(4-hydroxyphenyl)adamantane; and 1,3-bis(4-hydroxyphenyl)-5,7-dimethyladamantane, bis(4-hydroxyphenyl)diphenylmethane, 4,4'-[1,3-phenylenebis(1-methylethylidene)]bisphenol, 10,10-bis(4-hydroxyphenyl)-9-anthrone, 1,5-bis(4-hydroxyphenylthio)-2,3-dioxapentaene, and α,ω-bishydroxyphenylpolydimethylsiloxane compounds. These dihidric phenols can be used each alone or as a mixture of two or more kinds.

Examples of the carbonate compounds include diarylcarbonates such as diphenylcarbonate, dialkylcarbonates such as dimethylcarbonate and diethylcarbonate.

As the terminal terminator, any kinds of terminators that are usually used for polycarbonate polymerization can be used.

Specific examples of monohidric phenols include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-cdi-t-butylphenol, 2,5-dicumylphenol, 3,5-dicumylphenol, p-cresol, bromophenol, and tribromophenol. Of those monovalent phenols, p-t-butylphenol, p-cumylphenol, p-t-octylphenol, phenol, and the like are preferably used.

On top of the foregoing, any one of those described above as branching agents for polycarbonate copolymers can be used as the branching agent.

In ordinary cases, the aromatic polycarbonate resin to be used in the present invention has a viscosity average molecular weight of preferably 10,000 to 100,000, or more preferably 12,000 to 40,000.

In addition, the ratio at which the polycarbonate copolymer (A) and the aromatic polycarbonate resin are blended with each other in the polycarbonate resin of the present invention is preferably 100:0 to 30:70, or more preferably 100:0 to 40:60 at a mass ratio.

Light Diffusing Agent (B)

A light diffusing agent to be used in the present invention is optically transparent, and has a refractive index different from that of the polycarbonate resin.

Specific examples of the light diffusing agent include a crosslinked polymethyl methacrylate resin particle, a silicone resin particle, a polyorganosilsesquioxane particle, a silica particle, a quartz particle, a silica fiber, a quartz fiber, and a glass fiber. Of those, the crosslinked polymethyl methacrylate resin particle, the silicone resin particle, the polyorganosilsesquioxane particle, the silica particle, and the quartz particle can each be suitably used.

One kind of those light diffusing agents may be used alone, or two or more kinds of them may be used in combination.

The light diffusing agent to be used in the present invention is blended in an amount of 0.01 to 10 parts by mass, preferably 0.05 to 8 parts by mass, or more preferably 0.1 to 6 parts by mass into 100 parts by mass of the polycarbonate resin. When the amount in which the light diffusing agent is blended is 0.01 part by mass or more, the light diffusing resin composition to be obtained exerts light diffusing performance, and its luminance is improved. In addition, when the amount is 10 parts by mass or less, the light diffusing performance does not become excessive, and the luminance does not reduce.

The light diffusing agent has an average particle diameter of typically 1 to 200 μm, preferably 1 to 150 μm, or more preferably 2 to 100 μm.

Acrylic Resin (C)

An acrylic resin to be used in the present invention is a thermoplastic polymer using at least one kind selected from monomer units including acrylic acid, an acrylate, methacrylic acid, a methacrylate, acrylonitrile, methacrylonitrile, and derivatives of them as a repeating structural unit, and is a homopolymer or a copolymer with, for example, styrene or butadiene.

Specific examples of the polymer include polyacrylic acid, polymethyl methacrylate (PMMA), polyacrylonitrile, an ethyl acrylate-2-chloroethyl acrylate copolymer, an n-butyl acrylate-acrylonitrile copolymer, an acrylonitrile-styrene copolymer, an acrylonitrile-butadiene copolymer, and an acrylonitrile-butadiene-styrene copolymer. Of those, polymethyl methacrylate (PMMA) can be particularly suitably used.

A known product can be used as the polymer methacrylate (PMMA); in ordinary cases, a product is produced by the bulk polymerization of a methyl methacrylate monomer in the presence of a peroxide and an azo polymerization initiator is preferable.

The acrylic resin has a viscosity average molecular weight of typically 1,000 to 200,000, or preferably 20,000 to 100,000. When the viscosity average molecular weight falls within the range, the acrylic resin becomes excellent in compatibility with the polycarbonate resin as a matrix.

The acrylic resin is blended in an amount of typically 0.01 to 1 part by mass, preferably 0.05 to 0.5 part by mass, or more preferably 0.1 to 0.3 part by mass into 100 parts by mass of the polycarbonate resin. When the amount in which the acrylic resin is blended is 0.01 part by mass or more, the light conducting performance of the polycarbonate resin as a matrix becomes good, whereby the luminance of the light diffusing resin composition to be obtained is improved.

In addition, when the amount is 1 part by mass or less, the phase separation of the acrylic resin component does not occur, so the mixture containing the acrylic resin does not become opaque. As a result, the light conducting performance of the polycarbonate resin as a matrix does not reduce, whereby the luminance is improved.

The light diffusing resin composition of the present invention can be further blended with any one of the following additives as required.

Phosphorus Stabilizer (D)

A phosphorus stabilizer to be used in the present invention is, for example, a phosphoric acid compound and/or an aromatic phosphine compound.

Specific examples of the phosphate compounds include phosphorous acid, phosphoric acid, phosphonous acid, phosphonic acid, and esters thereof. Specific examples thereof include triphenylphosphite, tris(nonylphenyl)phosphite, tris(2,4-di-tert-butylphenyl)phosphite, tridecylphosphite, trioctylphopshite, trioctadecylphosphite, didecylmonophenyl phosphite, dioctylmonophenyl phosphite, diisoproplymonophenyl phosphite, momobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearyl pentaerythritol diphosphite, tributylphosphate, triethylphosphate, trimethylphosphate, triphenylphosphate, diphenyl monoorthoxenyl phosphate, dibutylphosphate, dioctylphosphiae, diisopropyl phosphate, 4,4'-biphenylene phosphinic acid tetrakis(2,4-di-tert-bitylphenyl), dimethyl benzene phosphonate, diethyl benzene phosphonate, and dipropyl benzene phosphonate.

Trisnonylphenylphosphite, trimethylphosphate, tris(2,4-di-tert-butylphenyl)phosphite and dimethyl benzene phosphonate are preferable.

As the aromatic phosphine compound, for example, an arylphosphine compound represented by the formula (P)

$$P\text{—}(X)_3 \tag{P}$$

(in the formula, X represents a hydrocarbon group, at least one of which is an optionally substituted aryl group having 6 to 18 carbon atoms) is exemplified.

Examples of the arylphosphine compounds of the formula (P) include triphenylphosphine, diphenylbutylphosphine, diphenyloctadecylphosphine, tris-(p-tolyl)phosphine, tris-(p-nonylphenyl)phosphine, tris-(naphthyl)phosphine, diphenyl(hydroxymethyl)phosphine, diphenyl(acetoxymethyl) phosphine, diphenyl-(β-ethylcarboxyethyl)phosphine, tris-(p-chlorophenyl)phosphine, tris-(p-fluorophenyl)phosphine, diphenylbenzyl phosphine, diphenyl-β-cyanoethyl phosphine, diphenyl-(p-hydroxyphenyl)phosphine, diphenyl-1,4-dihydroxyphenyl-2-phosphine, and phenylnaphthylbenzyl phosphine. Of these compounds, particularly triphenylphosphine is preferably used.

One kind of the above-mentioned phosphorus stabilizers may be used alone, or two or more kinds of them may be used in combination. The above-mentioned phosphorus stabilizers is blended in a total amount of generally 0.001 to 0.5 part by mass, preferably 0.005 to 0.3 part by mass, or more preferably 0.01 to 0.1 part by mass into 100 parts by mass of the polycarbonate resin. When the amount in which the phosphorus stabilizer is blended falls within the range, the thermal stability of the composition at the time of the molding of the composition is improved.

Organopolysiloxane (E)

An organopolysiloxane to be used in the present invention has at least one kind of a group selected from a phenyl group, a diphenyl group, a vinyl group, and an alkoxy group, and is, for example, a silicone compound (such as organosiloxane) obtained by introducing at least one kind of a group selected from a phenyl group, a diphenyl group, a vinyl group, and an alkoxy group into a silicone compound.

A preferable organopolysiloxane is, for example, an organopolysiloxane having a phenyl group and/or a diphenyl group, or a vinyl group and/or an alkoxy group.

A difference in refractive index between the organopolysiloxane to be used in the present invention and the polycarbonate resin is typically 0.15 or less, preferably 0.13 or less, or more preferably 0.1 or less.

The organopolysiloxane to be used in the present invention is blended in an amount of typically 0.01 to 1 part by mass, preferably 0.02 to 0.8 part by mass, or more preferably 0.03 to 0.3 part by mass into 100 parts by mass of the polycarbonate resin. When the amount in which the organopolysiloxane is blended falls within the range, the thermal stability of the light diffusing resin composition at the time of the molding of the composition is improved.

Alicyclic Epoxy Compound (F)

That is, the alicyclic epoxy compound to be used in the present invention means a cyclic aliphatic compound having an alicyclic epoxy group, that is, such an epoxy group that one oxygen atom is added to an ethylene bond in the aliphatic ring, and, specifically, a compound represented by any one of the following formulae (V) to (XIV) is suitably used.

[Chem 5]

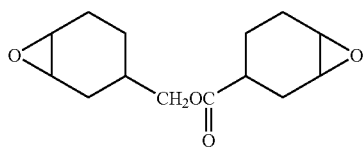

(V)

[Chem 6]

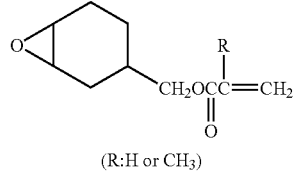

(R:H or CH$_3$)

(VI)

[Chem 7]

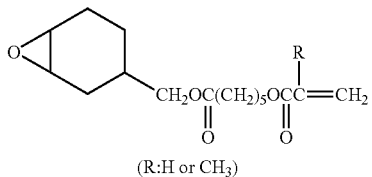

(R:H or CH$_3$)

(VII)

[Chem 8]

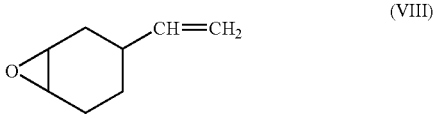

(VIII)

[Chem 9]

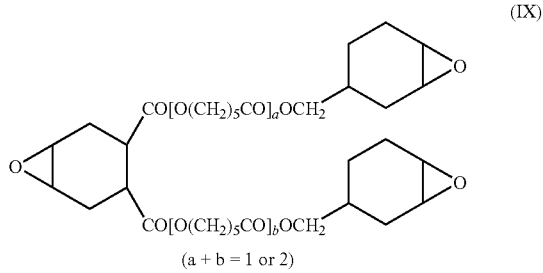

(a + b = 1 or 2)

(IX)

[Chem 10]

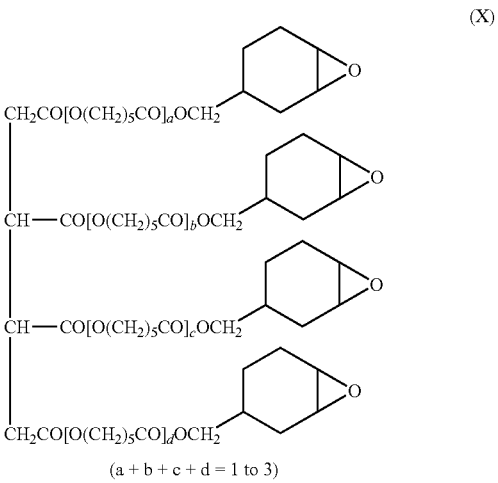

(a + b + c + d = 1 to 3)

(X)

-continued

[Chem 11]

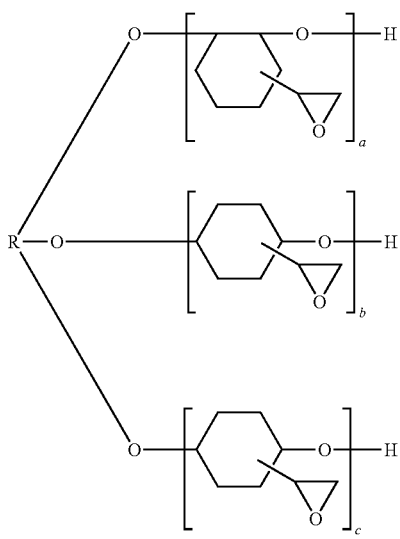

(XI)

(a + b + c = n (integer), R: hydrocarbon group)

[Chem 12]

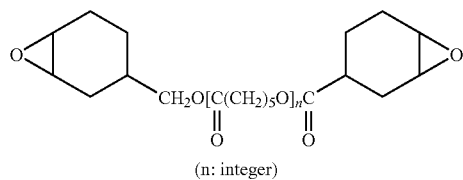

(XII)

(n: integer)

[Chem 13]

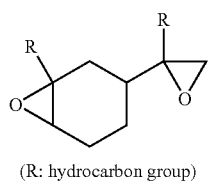

(XIII)

(R: hydrocarbon group)

[Chem 14]

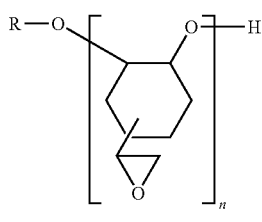

(XIV)

(n: integer, R: hydrocarbon group)

Of those, a compound represented by the formula (V), (X), or (XIV) is preferable because the compound is excellent in compatibility with the polycarbonate resin and does not impair the transparency of an article molded out of the composition.

The alicyclic epoxy compound is blended in an amount of 0.001 to 1 part by mass, preferably 0.005 to 0.8 part by mass, or more preferably 0.01 to 0.5 part by mass into 100 parts by mass of the polycarbonate resin. When the amount in which the compound is blended is 0.01 part by mass or more, the transparency and steam resistance of an article molded out of the composition are improved. In addition, when the amount is 1 part by mass or less, no phase separation between the polycarbonate resin and the compound occurs, and the transparency of the molded article is also good.

Various Additives

Any one of various additives may be blended into the light diffusing resin composition of the present invention as required to such an extent that an effect of the present invention is not impaired. Examples of the additives include: antioxidants such as a hindered phenol antioxidant, an ester antioxidant, and an amine antioxidant; UV absorbers such as a benzotriazole UV absorber, a benzophenone UV absorber, a malonate UV absorber, and an oxalylanilide UV absorber; light stabilizers such as a hindered amine light stabilizer; internal lubricants such as an aliphatic carboxylate internal lubricant, a paraffin internal lubricant, a silicone oil, and a polyethylene wax; flowability modifiers each composed of a copolymer of styrene and an acrylic compound; and flame retardants, flame retardant auxiliaries, release agents, antistatic agents, and colorants in common use.

The light diffusing resin composition of the present invention can be obtained by blending the above-mentioned respective components and melting and kneading the mixture as required. Ordinary methods can be adopted for the blending and the melting and kneading, and can be performed with, for example, a ribbon blender, a Henschel mixer, a Banbury mixer, a drum tumbler mixer, a single screw extruder, a twin screw extruder, a Ko-kneader, or a multi-screw extruder. An appropriate temperature at which the mixture is heated at the time of the melting and kneading is typically 250 to 300° C.

The light diffusing resin composition is suitable as a material for, for example, an optical molded body or a light diffusing plate because the resin of the composition has significantly improved melt flowability and the retention stability of the composition in, for example, an injection molding machine is improved.

An optical molded body is used in, for example, a liquid crystal display field, an application of optical parts, or light diffusing plates for a glass alternative application. Examples of the optical parts include optical devices such as an optical lens and a light diffusing member. Examples of the glass alternative application include a street light cover and a laminated glass for vehicles and building materials.

Light Diffusing Plate

The light diffusing resin composition of the present invention is suitable for a light diffusing plate. In addition, the present invention provides a light diffusing plate molded out of the light diffusing resin composition, and the light diffusing plate is produced by subjecting the light diffusing resin composition to, preferably, injection molding. The injection molding is performed while the temperature of a cylinder of an injection molding machine is set to preferably about 240 to 400° C., or more preferably about 280 to 380° C. and the temperature of a mold of the molding machine is set to preferably about 50 to 130° C.

The shape of the light diffusing plate is not particularly limited, and it is sufficient that a flat plate, curve plate, or the like having a thickness of 0.5 to 3 mm be molded out of the composition.

EXAMPLES

Next, the present invention will be described in more detail by way of examples. However, the present invention is by no means limited by these examples.

It should be noted that physical properties were measured in accordance with the following methods.

(1) Measurement of Viscosity Number

The viscosity number of a polycarbonate resin composition to be obtained in each example was measured in conformance with ISO 1628-4 (1999).

(2) Measurement of Melt Flowability (Q Value)

The amount of a molten resin (mL/sec) flowing out of a nozzle having a diameter of 1 mm and a length of 10 mm was measured with an elevated flow tester in conformance with JIS K7210 at 280° C. under a pressure of 15.7 MPa.

(3) Measurement of Transmittance and Haze

A molded article measuring 35 mm long by 25 mm wide by 2.0 mm thick was produced by an injection molding method, and its total light transmittance was measured with a direct-reading haze meter HGM-20DP manufactured by SUGA TEST INSTRUMENTS CO., LTD and a D65 light source.

(4) Measurement of YI

A molded article measuring 35 mm long by 25 mm wide by 2.0 mm thick was produced by injection molding, and its YI value was measured by a transmission method with a spectrocolorimeter Σ90 manufactured by Nippon Denshoku Industries Co., Ltd. and a C2 light source having a measurement area of 30 φ.

(5) Light Resistance Test

A molded article measuring 35 mm long by 25 mm wide by 2.0 mm thick was produced by injection molding. The sample was evaluated with a light resistance tester "UVCON UC-1" manufactured by ATLAS for its color tone change ΔE after irradiation with light from a fluorescent LW lamp as a light source for 24 hours under an atmosphere at 65° C.

(6) Retention Stability

The color tone change (ΔE) of a test piece molded out of a light diffusing resin composition after retention in a 40 t injection molding machine for 15 minutes was measured by a reflection method with a spectrocolorimeter Σ90 manufactured by Nippon Denshoku Industries Co., Ltd. and a C2 light source with a measurement area set to 30 φ while a test piece in the case where the light diffusing resin composition was not retained in the molding machine was used as a reference.

(7) Moldability

A light diffusing plate 32 inches on a side and having a thickness of 2 mm was molded out of a light diffusing resin composition with a 650 t injection molding machine. The case where the appearance of the plate did not show a gas burn and the thickness tolerance of the plate was in the range of ±100 μm was evaluated as ○, and any other case was evaluated as X.

Production Example 1

Step of Synthesizing Polycarbonate Oligomer

Sodium dithionite was charged at a concentration of 2,000 ppm with respect to bisphenol A (which may hereinafter be abbreviated as "BPA") to be dissolved later into a 5.6 mass % aqueous solution of sodium hydroxide. BPA was dissolved in the mixture so that the concentration of BPA was 13.5 mass %. Thus, an aqueous solution of sodium hydroxide containing BPA was prepared.

The aqueous solution of sodium hydroxide containing BPA, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor used had a jacket and the temperature at which a reaction liquid was discharged was kept at 40° C. or lower by passing cooling water through the jacket.

The reaction liquid ejected from the tubular reactor was continuously introduced into a tank type reactor with a baffle having a swept-back blade and an internal volume of 40 L. Further, the aqueous solution of sodium hydroxide containing BPA, a 25 mass % aqueous solution of sodium hydroxide, water, and a 1 mass % aqueous solution of triethylamine were added to the liquid at flow rates of 2.8 L/hr, 0.07 L/hr, 17 L/hr, and 0.64 L/hr, respectively so that a reaction was performed. The reaction liquid flooding out of the tank type reactor was continuously extracted, and was left at rest so that an aqueous phase was separated and removed, and a methylene chloride phase was collected.

A polycarbonate oligomer thus obtained was present at a concentration of 320 g/L, and had a chloroformate group at a concentration of 0.75 mol/L.

Polymerizing Step

15 L of the above oligomer solution, 9.0 L of methylene chloride, 187 g of p-tert-butylphenol (hereinafter abbreviated as "PTBP"), and 3.0 mL of triethylamine were fed into a 50 L tank type reactor provided with a baffle board, a paddle type stirring blade, and a cooling jacket. While the mixture was stirred, a potassium hydroxide solution containing bisphenol M (which may hereinafter be abbreviated as "BPM") (solution prepared by dissolving 973 g of bisphenol M in an aqueous solution prepared by dissolving 520 g of KOH and 1.9 g of sodium dithionite in 5.5 L of water) was charged into the mixture so that a reaction between the polycarbonate oligomer and bisphenol M was performed for 10 minutes.

An aqueous solution of sodium hydroxide containing BPA (solution prepared by dissolving 513 g of BPA in an aqueous solution prepared by dissolving 306 g of NaOH and 1.0 g of sodium dithionite in 4.5 L of water) was added to the polymer liquid, and the mixture was subjected to a polymerization reaction for 50 minutes.

10 L of methylene chloride for dilution were charged into the mixture, and the whole was stirred for 10 minutes. After that, the resultant was separated into an organic phase containing polycarbonate and an aqueous phase containing excessive amounts of BPA and NaOH, and the organic phase was isolated.

A solution of the polycarbonate in methylene chloride thus obtained was sequentially washed with 0.03 mol/L aqueous solution of KOH and 0.2 mol/L hydrochloric acid, the aqueous solution and hydrochloric acid each having a volume corresponding to 15 vol % of the volume of the solution of the polycarbonate. Next, the resultant was repeatedly washed with pure water until an electric conductivity in an aqueous phase after the washing became 0.01 μS/m or less.

The solution of the polycarbonate in methylene chloride obtained by the washing was concentrated and pulverized, and the resultant flake was dried under reduced pressure at 100° C., whereby a BPM copolymer (a) was obtained. A molar ratio between repeating structural units each derived from bisphenol M of BPM copolymer (a) and repeating structural units each derived from bisphenol A in the copolymer determined by $^{13}$C-NMR was 12:88.

Production Example 2

A BPM copolymer (b) was obtained in the same manner as in Production Example 1 except that: the addition amount of the aqueous solution of potassium hydroxide containing bisphenol M was changed as described below; and the addition of the aqueous solution of sodium hydroxide containing bisphenol A was not performed. A molar ratio between repeating structural units each derived from bisphenol M and repeating structural units each derived from bisphenol A in the copolymer determined by $^{13}$C-NMR was 22:78.
(Aqueous Solution of Potassium Hydroxide Containing Bisphenol M)

A solution prepared by dissolving 1,738 g of bisphenol M in an aqueous solution prepared by dissolving 957 g of KOH and 3.6 g of sodium dithionite in 10.1 L of water Production Example 3

A BPM copolymer (c) was obtained in the same manner as in Production Example 2 except that the addition amount of PTBP was changed from 191 g to 160 g.

A molar ratio between repeating structural units each derived from bisphenol M and repeating structural units each derived from bisphenol A in the copolymer determined by $^{13}$C-NMR was 22:78.

Production Example 4

A BPM copolymer (d) was obtained in the same manner as in Production Example 1 except that the addition amount of each of the aqueous solution of potassium hydroxide containing bisphenol M, the aqueous solution of sodium hydroxide containing bisphenol A, and PTBP was changed as described below. A molar ratio between repeating structural units each derived from bisphenol M and repeating structural units each derived from bisphenol A in the copolymer determined by $^{13}$C-NMR was 8:92.
(Aqueous Solution of Potassium Hydroxide Containing Bisphenol M)

A solution prepared by dissolving 649 g of bisphenol M in an aqueous solution prepared by dissolving 347 g of KOH and 1.3 g of sodium dithionite in 3.7 L of water
(Aqueous Solution of Sodium Hydroxide Containing Bisphenol A)

A solution prepared by dissolving 727 g of BPA in an aqueous solution prepared by dissolving 432 g of NaOH and 1.5 g of sodium dithionite in 6.3 L of water
(PTBP)
200 g Examples 1 to 23, and Comparative Examples 1 and 2

Raw materials were blended with each other at a composition ratio shown in Table 1, and the mixture was molten and kneaded for extrusion with a single screw extruder of 40 mmφ with a vent at a resin temperature of 280° C. at a screw speed of 100 rpm, whereby each pellet was obtained. Table 1 shows the kind of a carbonate resin used, the content (mol %) of bisphenol M, and the results of the measurement of the viscosity average molecular weight and Q value of each pellet. In addition, a light diffusing plate was molded out of each of the resultant pellets by an injection molding method, and was evaluated for moldability, transmittance, haze, color tone of diffused light, light resistance, and retention stability. Table 2 shows the results.

Note that, in Table 1, respective polycarbonate resins are as follows:

(1) FN1500: aromatic polycarbonate resin (TAFLON FN1500, manufactured by Idemitsu Petrochemical Co., Ltd.); (2) PEP36: phosphorous stabilizer (ADEKASTAB PEP36, manufactured by ASAHI DENKA Co. Ltd.); (3) KMP590: silicone resin particle (manufactured by Shin-Etsu Chemical Co., Ltd.); (4) X-52-1621: silicone diffusion particulate (manufactured by Shin-Etsu Chemical Co., Ltd.); (5) EXL-5136: methacrylate resin (manufactured by Rohm and Haas Company); (6) MBX-20 (manufactured by Sekisui Plastics Co., Ltd.); (7) Tospearl 120:crosslinked silicone resin (manufactured by TOSHBA CORPORATION); (8) BR83: acrylic resin (DIANALBR83, manufactured by Mitsubishi Rayon Co., Ltd.); (9) KR511: organopolysiloxane (manufactured by Shin-Etsu Chemical Co., Ltd.); (10) SH556 (manufactured by Dow Corning Toray Co., Ltd.,; (11) KF56 (manufactured by Shin-Etsu Chemical Co., Ltd.); (12) SH710 (manufactured by Dow Corning Toray Co., Ltd.,; (13) DC3037 (manufactured by Dow Corning Toray Co., Ltd.,; (14) 2021P:alicyclic epoxy compound (CELLOXIDE 2021P, manufactured by Daicel Chemical Industries Ltd.); (15) Chemisoap 79: light-resisting agent (Trade Mark, manufactured by Chemipro Kasei Kaisha, Ltd.); (16) HOSTAVIN B-CAP: light-resisting agent (Trade Name, manufactured by Clariant Japan K.K.); (17) HOSTAVIN VSU: light-resisting agent (Trade Name, manufactured by Clariant Japan K.K.); (18) PR25: light-resisting agent (Trade Name, manufactured by Clariant Japan K.K.); (19) TP003: styrene/phenylmethacrylate copolymer (manufactured by Mitsubishi Rayon Co., Ltd.).

TABLE 1-1

| | Polycarbonate resin | | | | Phosphorus stabilizer (D) | | Light diffusing agent (B) | | Acrylic resin (C) | |
| --- | --- | --- | --- | --- | --- | --- | --- | --- | --- | --- |
| | Kind of PC | BPM:BPA Molar ratio | Viscosity number | Q value | Kind | Amount (mass %) | Kind | Amount (mass %) | Kind | Amount (mass %) |
| Example 1 | BPM copolymer (a) | 12:88 | 39.4 | 63 | PEP36 | 0.05 | KMP590 (2 μm) | 0.5 | — | — |
| Example 2 | BPM copolymer (b) | 22:78 | 39.4 | 80 | PEP36 | 0.05 | KMP590 (2 μm) | 0.5 | — | — |
| Example 3 | BPM copolymer (c) | 22:78 | 43.9 | 50 | PEP36 | 0.05 | KMP590 (2 μm) | 0.5 | — | — |
| Example 4 | BPM copolymer (d) | 8:92 | 38.0 | 65 | PEP36 | 0.05 | KMP590 (2 μm) | 0.5 | — | — |
| Example 5 | BPM copolymer (b) 50 parts by mass + FN1500 50 parts by mass | 12:88 | 39.4 | 62 | PEP36 | 0.05 | KMP590 (2 μm) | 0.5 | — | — |
| Example 6 | BPM copolymer (a) | 12:88 | 39.4 | 63 | PEP36 | 0.05 | X-52-1621 (5 μm) | 0.9 | — | — |
| Example 7 | BPM copolymer (a) | 12:88 | 39.4 | 63 | PEP36 | 0.05 | EXL-5136 (5 μm) | 1.6 | — | — |

TABLE 1-1-continued

| | Polycarbonate resin | | | | Phosphorus stabilizer (D) | | Light diffusing agent (B) | | Acrylic resin (C) | |
|---|---|---|---|---|---|---|---|---|---|---|
| | Kind of PC | BPM:BPA Molar ratio | Viscosity number | Q value | Kind | Amount (mass %) | Kind | Amount (mass %) | Kind | Amount (mass %) |
| Example 8 | BPM copolymer (a) | 12:88 | 39.4 | 63 | PEP36 | 0.05 | MBX-20 (20 µm) | 5.0 | — | — |
| Example 9 | BPM copolymer (a) | 12:88 | 39.4 | 63 | PEP36 | 0.05 | TOSPEARL 120 | 0.5 | — | — |
| Example 10 | BPM copolymer (a) | 12:88 | 39.4 | 63 | PEP36 | 0.05 | KMP590 | 0.5 | BR83 | 0.1 |
| Example 11 | BPM copolymer (a) | 12:88 | 39.4 | 63 | PEP36 | 0.05 | KMP590 | 0.5 | BR83 | 0.1 |
| Example 12 | BPM copolymer (a) | 12:88 | 39.4 | 63 | PEP36 | 0.05 | KMP590 (2 µm) | 0.5 | — | — |
| Example 13 | BPM copolymer (a) | 12:88 | 39.4 | 63 | PEP36 | 0.05 | KMP590 (2 µm) | 0.5 | — | — |
| Example 14 | BPM copolymer (a) | 12:88 | 39.4 | 63 | PEP36 | 0.05 | KMP590 (2 µm) | 0.5 | — | — |
| Example 15 | BPM copolymer (a) | 12:88 | 39.4 | 63 | PEP36 | 0.05 | KMP590 (2 µm) | 0.5 | — | — |
| Example 16 | BPM copolymer (a) | 12:88 | 39.4 | 63 | PEP36 | 0.05 | KMP590 | 0.5 | BR83 | 0.1 |
| Example 17 | BPM copolymer (a) | 12:88 | 39.4 | 63 | PEP36 | 0.05 | KMP590 | 0.5 | BR83 | 0.1 |
| Example 18 | BPM copolymer (a) | 12:88 | 39.4 | 63 | PEP36 | 0.05 | KMP590 | 0.5 | BR83 | 0.1 |
| Example 19 | BPM copolymer (a) | 12:88 | 39.4 | 63 | PEP36 | 0.05 | KMP590 | 0.5 | BR83 | 0.1 |
| Example 20 | BPM copolymer (a) | 12:88 | 39.4 | 63 | PEP36 | 0.05 | KMP590 | 0.5 | BR83 | 0.1 |
| Example 21 | BPM copolymer (a) | 12:88 | 39.4 | 63 | PEP36 | 0.05 | KMP590 | 0.5 | BR83 | 0.1 |
| Example 22 | BPM copolymer (a) | 12:88 | 39.4 | 63 | PEP36 | 0.05 | KMP590 | 0.5 | BR83 | 0.1 |
| Example 23 | BPM copolymer (d) | 8:92 | 38.0 | 65 | PEP36 | 0.05 | KMP590 | 0.5 | BR83 | 0.1 |
| Comparative Example 1 | FN1500 | — | 39.4 | 40 | PEP36 | 0.05 | KMP590 | 0.5 | — | — |
| Comparative Example 2 | BPM copolymer (a) | 12:88 | 39.4 | 63 | PEP36 | 0.05 | KMP590 | 15 | — | — |

TABLE 1-2

| | Organopolysiloxane (E) | | Alicyclic epoxy compound (F) | | Light resisting agent | | Styrene/phenyl methacrylate copolymer | | Resin composition |
|---|---|---|---|---|---|---|---|---|---|
| | Kind | Amount (mass %) | Kind | Amount (mass %) | Kind | Amount (mass %) | Kind | Amount (mass %) | Viscosity number |
| Example 1 | — | — | — | — | — | — | — | — | 39.4 |
| Example 2 | — | — | — | — | — | — | — | — | 39.3 |
| Example 3 | — | — | — | — | — | — | — | — | 43.9 |
| Example 4 | — | — | — | — | — | — | — | — | 38.1 |
| Example 5 | — | — | — | — | — | — | — | — | 39.5 |
| Example 6 | — | — | — | — | — | — | — | — | 39.4 |
| Example 7 | — | — | — | — | — | — | — | — | 39.5 |
| Example 8 | — | — | — | — | — | — | — | — | 39.4 |
| Example 9 | — | — | — | — | — | — | — | — | 39.4 |
| Example 10 | — | — | — | — | — | — | — | — | 39.4 |
| Example 11 | KR511 | 0.1 | — | — | — | — | — | — | 39.3 |
| Example 12 | SH556 | 0.1 | — | — | — | — | — | — | 39.3 |
| Example 13 | KF56 | 0.1 | — | — | — | — | — | — | 39.3 |
| Example 14 | SH710 | 0.1 | — | — | — | — | — | — | 39.3 |
| Example 15 | DC3037 | 0.1 | — | — | — | — | — | — | 39.3 |
| Example 16 | KR511 | 0.1 | 2021P | 0.05 | — | — | — | — | 39.4 |
| Example 17 | KR511 | 0.1 | 2021P | 0.05 | Chemisoap 79 | 0.3 | — | — | 39.3 |
| Example 18 | KR511 | 0.1 | 2021P | 0.05 | HOSTAVIN B-CAP | 1.0 | — | — | 39.2 |
| Example 19 | KR511 | 0.1 | 2021P | 0.05 | HOSTAVIN B-CAP | 0.3 | — | — | 39.3 |
| Example 20 | KR511 | 0.1 | 2021P | 0.05 | HOSTAVIN VSU | 0.3 | — | — | 39.3 |
| Example 21 | KR511 | 0.1 | 2021P | 0.05 | PR-25 | 0.3 | — | — | 39.3 |
| Example 22 | KR511 | 0.1 | 2021P | 0.05 | HOSTAVIN B-CAP | 1.0 | TP003 | 5 | 39.2 |
| Example 23 | KR511 | 0.1 | 2021P | 0.05 | Chemisoap 79 | 0.3 | TP003 | 5 | 39.3 |
| Comparative Example 1 | — | — | — | — | — | — | — | — | 39.4 |
| Comparative Example 2 | — | — | — | — | — | — | — | — | — |

TABLE 2

|  | Moldability (32 inches) | Transmittance (%, 2 mm) | Haze (%, 2 mm) | Color tone of diffused light YI (2 mm) | Light resistance ΔE, (2 mm) | Retention stability ΔE, (3 mm) |
|---|---|---|---|---|---|---|
| Example 1 | ○ | 63.5 | 93.1 | 2.8 | — | — |
| Example 2 | ○ | 63.5 | 93.2 | 2.8 | — | — |
| Example 3 | ○ | 63.5 | 93.1 | 2.8 | — | — |
| Example 4 | ○ | 63.5 | 93.1 | 2.8 | — | — |
| Example 5 | ○ | 63.5 | 93.2 | 2.8 | — | — |
| Example 6 | ○ | 63.8 | 93.1 | 2 | — | — |
| Example 7 | ○ | 64.5 | 93.1 | 3 | — | — |
| Example 8 | ○ | 67.3 | 93.2 | 3 | — | — |
| Example 9 | ○ | 63.5 | 93.1 | 2.8 | — | — |
| Example 10 | ○ | 64.5 | 93.1 | 2.6 | — | — |
| Example 11 | ○ | 64.5 | 93.0 | 2.6 | 12 | — |
| Example 12 | ○ | 64.6 | 93.1 | 2.5 | — | — |
| Example 13 | ○ | 64.5 | 93.1 | 2.6 | — | — |
| Example 14 | ○ | 64.6 | 93.0 | 2.5 | — | — |
| Example 15 | ○ | 64.5 | 93.1 | 2.6 | — | — |
| Example 16 | ○ | 64.5 | 93.0 | 2.6 | — | — |
| Example 17 | ○ | 64.5 | 93.2 | 3.1 | 9 | — |
| Example 18 | ○ | 64.5 | 93.1 | 2.7 | 5 | 16 |
| Example 19 | ○ | 64.5 | 93.1 | 2.6 | 7 | — |
| Example 20 | ○ | 64.5 | 93.1 | 2.7 | 7 | — |
| Example 21 | ○ | 64.5 | 93.1 | 2.7 | 7 | — |
| Example 22 | ○ | 63.0 | 93.4 | 3.7 | 5 | 5 |
| Example 23 | ○ | 63.0 | 93.5 | 4.1 | 9 | — |
| Comparative Example 1 | x | 63.5 | 93.2 | 2.8 | — | — |
| Comparative Example 2 | ○ | 16.0 | 99.0 | — | — | — |

INDUSTRIAL APPLICABILITY

The use of the light diffusing resin composition of the present invention provides a molded body having the following characteristics: even when the composition is molded into a large-sized light diffusing plate as the molded body, the plate is free of yellowing due to the thermal deterioration of the resin in the composition, and has good light diffusing performance. Accordingly, the composition can be suitably utilized in, for example, an optical device in a liquid crystal display field such as a light diffusing plate, or a glass alternative application such as a street light cover or a laminated glass for vehicles and building materials.

The invention claimed is:

1. A light diffusing resin composition, comprising:
   a polycarbonate composition comprising an aromatic polycarbonate resin and a polycarbonate copolymer (A) having repeating structural units represented by the following formulae (I) and (II):

[Chem 1]

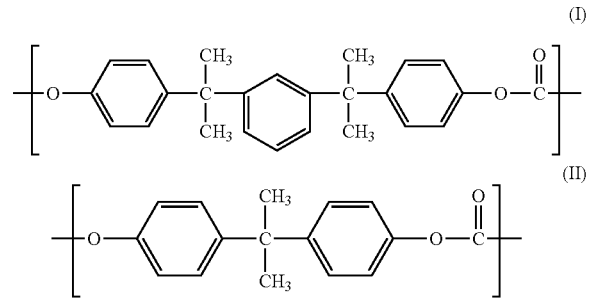

wherein the repeating structural units represented by the formula (I) and the repeating structural units represented by the formula (II) are present in a formula (I):formula (II) molar ratio of 8:92 to 12:88; and
   a light diffusing agent (B), the light diffusing agent (B) being present in an amount of 0.01 to 10 parts by mass relative to 100 parts by mass of the polycarbonate resin composition,
   wherein said polycarbonate composition comprises said polycarbonate copolymer (A) and said aromatic polycarbonate resin in a polycarbonate copolymer (A):aromatic polycarbonate resin mass ratio of 100:0 to 30:70.

2. The light diffusing resin composition according to claim 1, wherein the polycarbonate copolymer (A) has a viscosity number of 30 to 70.

3. The light diffusing resin composition according to claim 1, further comprising an acrylic resin (C) in an amount of 0.01 to 1 parts by mass relative to 100 parts by mass of the polycarbonate resin composition.

4. The light diffusing resin composition according to claim 1, further comprising an organopolysiloxane (E) in an amount of 0.01 to 1 parts by mass relative to 100 parts by mass of the polycarbonate resin composition.

5. The light diffusing resin composition according to claim 1, further comprising an alicyclic epoxy compound (F) in an amount of 0.001 to 1 parts by mass relative to 100 parts by mass of the polycarbonate resin composition.

6. The light diffusing resin composition according to claim 1, wherein the acrylic resin (C) has a viscosity average molecular weight of 1,000 to 200,000.

7. The light diffusing resin composition according to claim 1, wherein the light diffusing agent (B) comprises at least one member selected from the group consisting of crosslinked polymethyl methacrylate resin particles, silicone resin particles, polyorganosilsesquioxane particles, silica particles, quartz particles, silica fibers, quartz fibers, and glass fibers.

8. The light diffusing resin composition according to claim 1, wherein the light diffusing agent (B) has an average particle diameter of 1 to 200 μm.

9. The light diffusing resin composition according to claim 1, wherein the light diffusing resin composition has a viscosity number of 30 to 70.

10. A light diffusing plate, which is obtained by molding the light diffusing resin composition according to claim 1 and has a thickness of 0.5 to 3 mm.

11. The light diffusing resin composition according to claim 1, wherein the light diffusing agent (B) is present in an amount of 0.05 to 8 parts by mass relative to 100 parts by mass of the polycarbonate resin composition.

12. The light diffusing resin composition according to claim 1, further comprising an acrylic resin (C) in an amount of 0.05 to 0.5 parts by mass relative to 100 parts by mass of the polycarbonate resin composition.

13. The light diffusing resin composition according to claim 1, further comprising a phosphorous stabilizer (D) in an amount of 0.001 to 0.5 parts by mass relative to 100 parts by mass of the polycarbonate resin composition.

14. The light diffusing resin composition according to claim 1, further comprising an organopolysiloxane (E) in an amount of 0.01 to 0.3 parts by mass relative to 100 parts by mass of the polycarbonate resin composition.

15. The light diffusing resin composition according to claim 1, wherein said polycarbonate resin consists of said aromatic polycarbonate resin and said polycarbonate copolymer (A), and wherein said polycarbonate copolymer (A) consists of repeating structural units represented by said formulae (I) and (II).

16. The light diffusing resin composition according to claim 1, wherein said polycarbonate resin consists of said polycarbonate copolymer (A), and wherein said polycarbonate copolymer (A) consists of repeating structural units represented by said formulae (I) and (II).

17. The light diffusing resin composition according to claim 1, further comprising a phosphorous stabilizer (D) in an amount of 0.001 to 0.5 parts by mass relative to 100 parts by mass of the polycarbonate resin composition.

18. The light diffusing resin composition according to claim 17, wherein the phosphorus stabilizer (D) comprises a phosphoric acid compound and/or an aromatic phosphine compound.

\* \* \* \* \*